United States Patent
Krikorian et al.

(10) Patent No.: US 8,102,310 B2
(45) Date of Patent: Jan. 24, 2012

(54) DISMOUNT STEP DISCRIMINATION WITH TEMPORAL ADAPTIVE MATCHED FILTERING OF DOPPLER SPECTRAL FEATURES

(75) Inventors: Kapriel Krikorian, Calabasas, CA (US); Robert Rosen, Agoura Hills, CA (US); Mary Krikorian, Calabasas, CA (US)

(73) Assignee: Raytheon Company, Waltham, MA (US)

( * ) Notice: Subject to any disclaimer, the term of this patent is extended or adjusted under 35 U.S.C. 154(b) by 96 days.

(21) Appl. No.: 12/416,098

(22) Filed: Mar. 31, 2009

(65) Prior Publication Data

US 2010/0245159 A1  Sep. 30, 2010

(51) Int. Cl.
*G01S 13/00* (2006.01)
(52) U.S. Cl. .......... 342/195; 342/90; 342/160; 342/162; 342/192
(58) Field of Classification Search ............... 342/90, 342/160, 162, 192, 195
See application file for complete search history.

(56) References Cited

U.S. PATENT DOCUMENTS

| | | |
|---|---|---|
| 3,983,558 A | 9/1976 | Rittenbach |
| 5,113,194 A | 5/1992 | Krikorian et al. |
| 5,381,154 A | 1/1995 | Guerci |
| 5,565,872 A | 10/1996 | Prevatt et al. |
| 5,784,026 A | 7/1998 | Smith et al. |
| 6,661,345 B1 | 12/2003 | Bevan et al. |
| 6,922,145 B2 | 7/2005 | Piesinger |
| 6,943,724 B1 | 9/2005 | Brace et al. |
| 7,382,310 B1 | 6/2008 | Piesinger |
| 7,483,569 B2 * | 1/2009 | Bhagavatula et al. ........ 382/181 |
| 7,535,412 B1 | 5/2009 | Blunt et al. |
| 2003/0164792 A1 * | 9/2003 | Jahangir et al. .................. 342/90 |
| 2005/0018925 A1 * | 1/2005 | Bhagavatula et al. ........ 382/278 |

OTHER PUBLICATIONS

Geisheimer, et al., "A Continuous-Wave (CW) Radar for Gait Analysis", Conference Record of the Thirty-Fifth Asilomar Conference on Signals, Systems and Computers, Nov. 2001, vol. 1, (pp. 834-838).
Hersey, et al., "Dismount Modeling And Detection From Small Aperture Moving Radar Platforms", Radar, 2008 IEEE Radar Conference, May 2008 (pp. 1-6).
Otero, "Application Of A Continuous Wave Radar for Human Gait Recognition", Proceedings of the SPIE Signal Processing, Sensor Fusion, and target Recognition XIV, 2005, Col. 5809, (pp. 538-548).

* cited by examiner

*Primary Examiner* — Timothy A Brainard
(74) *Attorney, Agent, or Firm* — Christie, Parker & Hale, LLP

(57) ABSTRACT

A process for detecting and discriminating a particular target, such as an ambulating human, amidst an environment crowded with other objects or humans having similar doppler profiles to the desired target. A method according to one embodiment includes generating an initial radar image corresponding to a received doppler profile of a target, and generating a matched filter signal corresponding to the received doppler profile. The matched filter signal is correlated with subsequently received radar images to detect and discriminate the target.

8 Claims, 4 Drawing Sheets

DISMOUNT STEP DISCRIMINATION WITH TEMPORAL ADAPTIVE MATCHED FILTERING OF DOPPLER SPECTRAL FEATURES

BACKGROUND OF THE INVENTION

Conventional pulse doppler radar systems radiate a coherent pulse train that, when reflected by a scatterer, returns signals that can provide data including the range (the distance from the antenna) and the range rate (the radial velocity away from the antenna) of the scatterer. A wide range of pulse doppler radar systems have been used in the prior art, with applications including airborne or surface-based antennas, for surveillance, weapons control and tracking, and meteorological observation, among others. In general, pulse doppler radar systems are used where moving targets are desired to be detected amidst an environment replete with clutter, or scatterers other than the desired target.

Due to rapid advances in digital signal processing (DSP) technology, many modern radar systems, including pulse doppler radar systems, digitize the return signals and utilize DSP for target detection and discrimination. DSP technology can improve the performance of a radar system while reducing its cost. Furthermore, the flexibility allowed by DSP systems can improve signal detection by enabling real-time adaptation of the receiver to various conditions.

However, radar detection of slow-moving targets such as walking humans (known in the field as dismounts) is significantly degraded by clutter. Furthermore, even if a dismount were detected, the discrimination of a particular dismount within a crowded environment is a goal rarely if ever achieved within the prior art. Thus, there is a need for a radar system capable of detecting and discriminating a slow-moving target such as a particular walking human in a crowd.

SUMMARY

The present invention provides for a method of detecting and discriminating a particular target amidst an environment crowded with other objects or dismounts having similar doppler profiles to the desired target. In one aspect, the invention provides for a method including generating an initial radar image corresponding to a received doppler profile of a target; generating a matched filter signal corresponding to the received doppler profile of the target; generating a subsequent radar image; and correlating the matched filter signal with the subsequent radar image to discriminate the target.

The initial radar image may be generated by receiving and storing information corresponding to a doppler profile of radiation scattered off the target over a plurality of coherent arrays, and smoothing the information to reduce minor variations in the information in doppler or time. Smoothing the information may include calculating a time average of the doppler profile over a plurality of intervals, such as steps by the dismount. The matched filter signal may include voltages that generally match the smoothed information in doppler and time. The output of the matched filter may be stretched in doppler or in time to account for variations in the doppler profile of the target.

Another aspect of the invention provides for the correlation of a stored doppler profile of an intended target generated by the matched filter with the received radar image, rather than the correlation with the previously received profile.

These and other aspects of the invention are more fully comprehended upon review of this disclosure.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
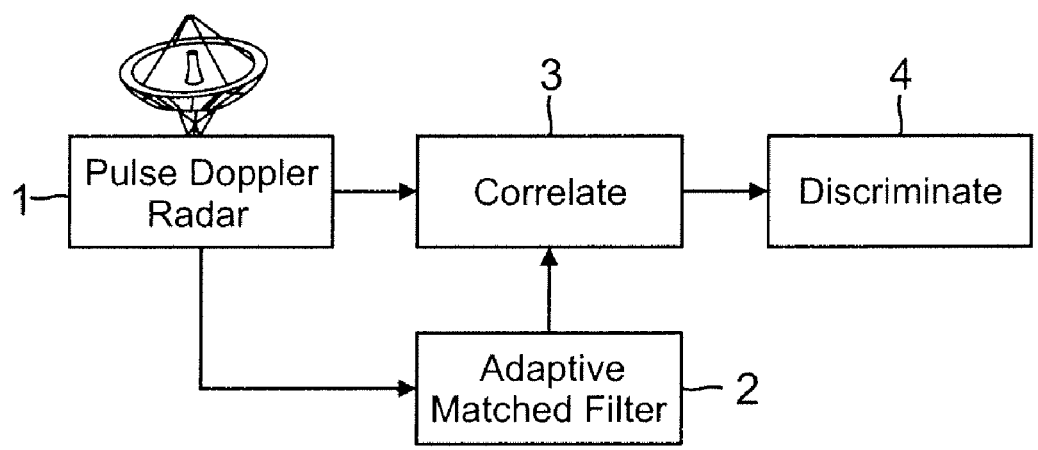
FIG. 1 is a block diagram illustrating a system for executing a process according to an exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

The walking and/or running motion of the legs and arms of the human body is generally periodic, resembling the harmonic motion of a pendulum. One aspect of an exemplary embodiment of the present invention enables the detection of the presence of this human motion and the discrimination of particular individuals among crowds. Further, embodiments provide a system capable of detecting and storing the doppler profile of a dismount (e.g., a particular walking man), followed by correlating the detected doppler profile with that of subsequently received data.

While the following detailed description frequently utilizes the term dismount, which generally refers to a human who is walking, running, or otherwise not aboard a vehicle, various embodiments of the present invention are not limited thereto. In fact, some embodiments enable the detection and discrimination of any radar scatterer that exhibits harmonic motions having distinct and/or unique characteristics. Thus, one skilled in the art will comprehend that the use of the term dismount in regard to a number of embodiments is not intended to limit the disclosure in any way.

FIG. 1 is a block diagram illustrating a system for carrying out a process according to an exemplary embodiment of the present invention. The system of FIG. 1 includes a pulse doppler radar 1, an adaptive matched filter 2, a correlator 3, and a discriminator 4. Briefly, the system for executing the process according to this exemplary embodiment utilizes the pulse doppler radar 1 to measure the doppler profile of a dismount. After characterizing the doppler profile of the dismount, the profile is sent to the adaptive matched filter 2, which thereafter generates voltages corresponding to the characteristics of the dismount as detected by the radar 1. Thereafter, as the radar 1 continues to generate signals in real time, the real time signals are correlated by block 3 with the output of the adaptive matched filter 2. Thus, based on the output of the correlator 3, the discriminator 4 discriminates that same dismount from among other signals returned by the radar 1.

Figure 2:
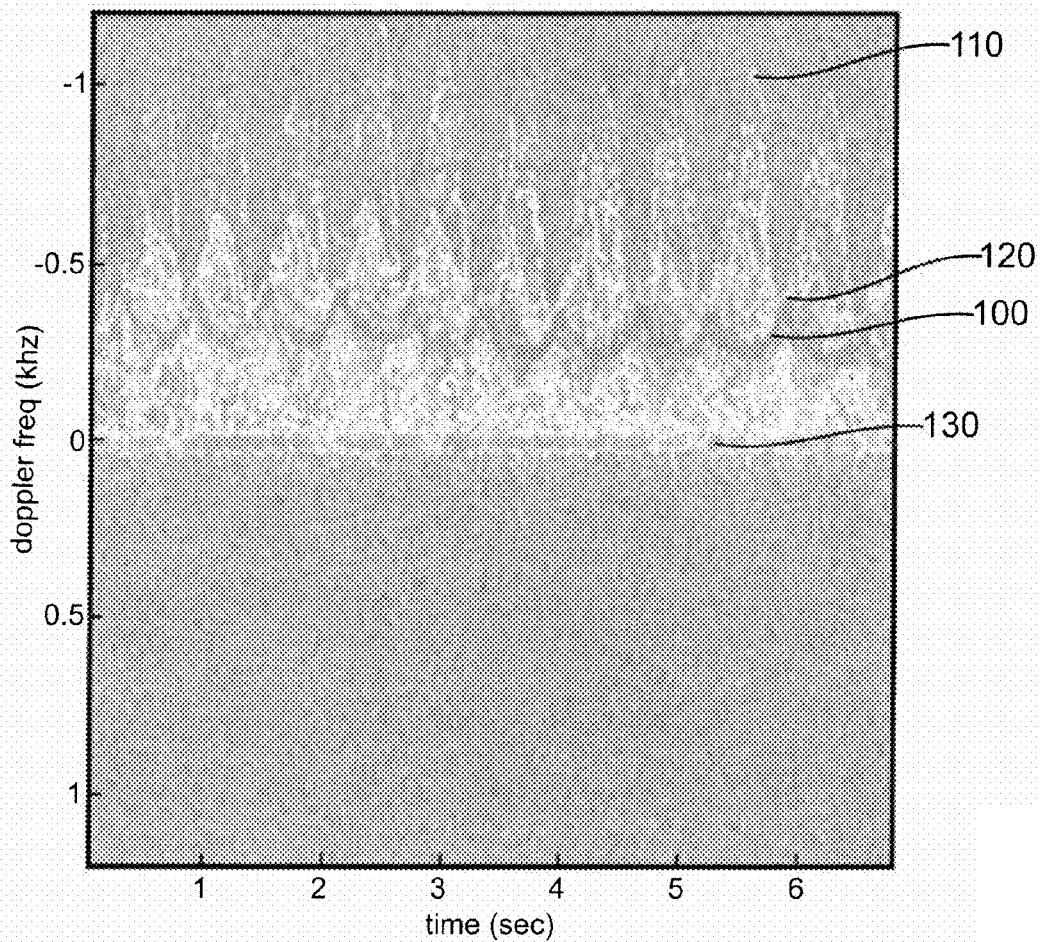
FIGS. 2 and 3 are time-doppler charts illustrating the doppler profile of an ambulating dismount.

Aspects of the instant invention will be better understood from the following description of a doppler radar image of a walking human. The radar return from an ambulating dismount varies over time. For example, the return signal is different at the time when a foot just comes into contact with the ground, and when the foot is swinging between steps. In FIG. 2, an example of measured doppler returns from such a dismount is shown. The horizontal axis represents time, and the vertical axis represents the doppler shift. The color (or gray level) of the plot represents the amplitude of the signal at that particular time and doppler shift.

Some embodiments of the present invention generate a doppler image of a target by utilizing a series of doppler filters in contiguous or overlapping coherent arrays. Thus, because the harmonic motion of a walking man has several frequency components, several different doppler filters will generate a return signal as the subject walks across the field of observation. The doppler image is then created in part by integrating the outputs of these several doppler filters.

As shown in the illustration of FIG. 2, a relatively dark portion forms a visible line 100 (representing a high amplitude) that appears to oscillate over a relatively constant rate. This portion of the signal indicates the swaying of the subject's torso as the subject walks. Similarly, portions 110 of the spreading of the doppler returns having a relatively high amplitude (darker in this example) indicate the returns from the subject's legs, and other portions 120 with a relatively lower amplitude (lighter in gray scale) indicate the returns from the subject's arms. That is, as the subject extends his leg, for example, the signature of the leg is spreading over doppler. In some cases the doppler spreading from the leg will be in the range of two and a half to three times that of the torso, because the legs may move two and a half to three times as fast as the torso.

In the data illustrated in FIG. 2, the radar antenna was stationary, so there is no spreading of the clutter in doppler, as seen with the strong signal 130 at zero doppler shift. Note that some embodiments of the present invention are adapted to recognize the doppler profile among clutter using moving and/or stationary platforms. For example, some embodiments null or zero out areas of the doppler profile that are likely to contain signals indicative of clutter. Some embodiments also cancel signals if the amplitude of the return signal is below a certain threshold that would otherwise indicate the potential presence of a dismount.

Figure 3:
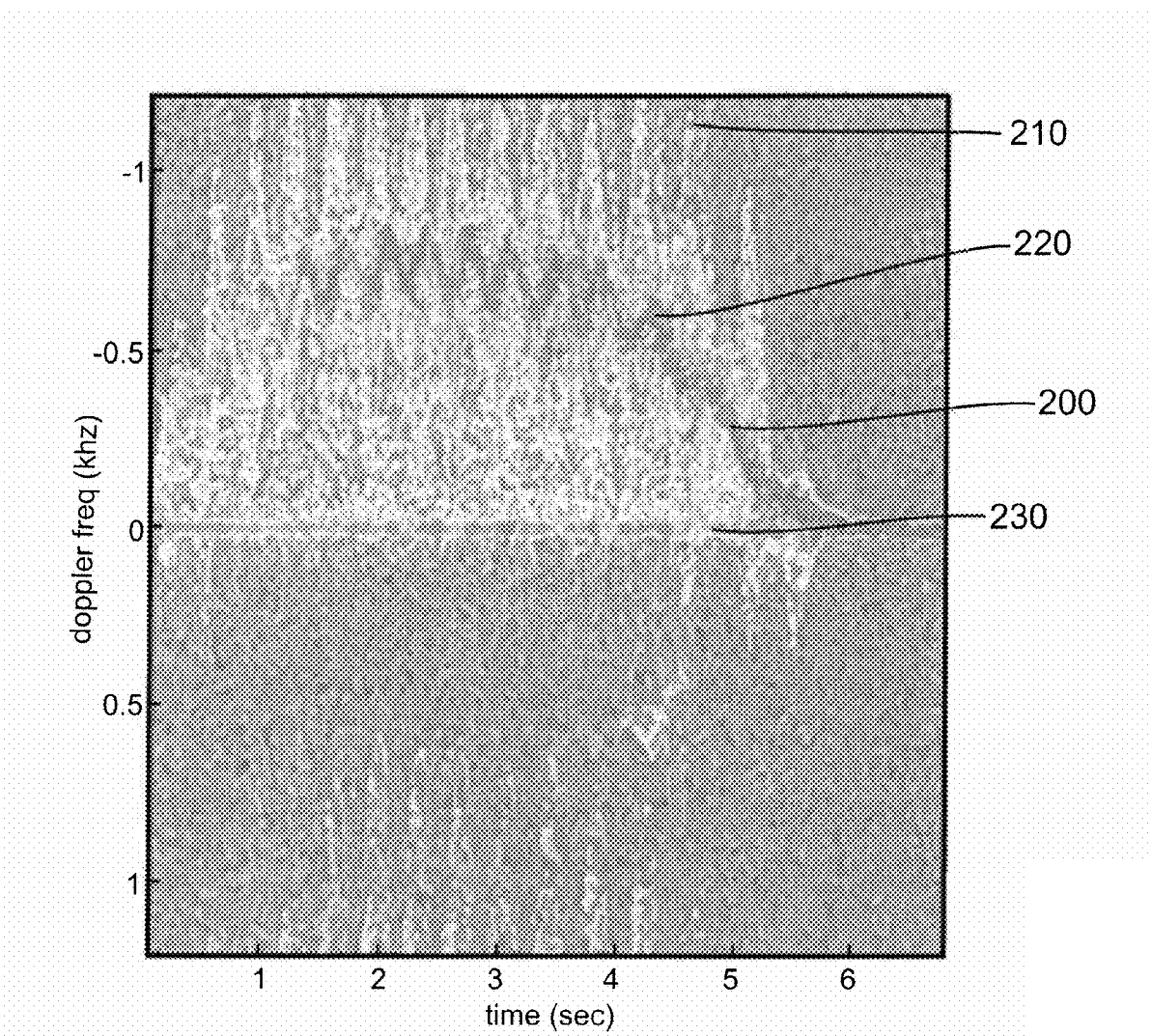

Referring now to FIG. 3, a doppler profile is shown for a subject running at a 15 degree angle relative to a line extending radially from the radar. The graph has the same axes as those in FIG. 2. It is clear from this graph that the changes in the doppler profile occur more rapidly, as the subject is running, as opposed to the walking shown in FIG. 2.

It is also seen that the range rate of the subject changed over time, due to the changing aspect angle of the subject. This change in the range rate resulted in the observed changes in the doppler shift over time. However, it can be seen in FIG. 3 that aside from the differences already mentioned, the body sway from the subject's torso, and the motion of the arms and legs generally resemble the profile of the walking subject from FIG. 2.

Some embodiments first detect the presence of high-amplitude returns representing the main accelerations caused by the torso by determining whether the signals from certain doppler filters corresponding to the energy returned from a torso exceed a threshold. In these embodiments, if the threshold is met and/or exceeded, indicating the potential presence of the torso of a dismount, further processing is performed.

The received signal is then analyzed for the presence of energy at doppler above and/or below the potential torso signal, to determine whether signal components corresponding to moving arms and/or legs are found, for example. In one exemplary embodiment, eight doppler filters are observed for signal returns above that of the torso signal to determine whether the doppler profile matches what would be expected for a dismount. If the profile matches, the signal is determined to potentially be that of a dismount.

Of course, the doppler profile of each step will have its own unique details, due to minor variations in the motion of the dismount with each step. As such, smoothing of the received doppler profile may be desired so as to remove some of these anomalies.

Thus, some embodiments generate a sum of the radar returns over time, and utilize the sum to calculate a time-averaged profile over a certain number of steps. For example, the doppler profile of the dismount in one embodiment is averaged over ten steps. In this embodiment, the average is calculated over the whole step, thus reducing or eliminating small anomalies in the doppler profile that may occur during any individual step, resulting in an improved doppler profile of the whole step. Some embodiments alternatively (or additionally) pass the return signal through a low-pass filter to smooth out the signal profile for each step.

Some embodiments additionally or alternatively smooth the doppler profile in doppler. That is, each sample of the radar return signal is smoothed by averaging or low-pass filtering in doppler (e.g., the vertical axis of FIGS. 2-3).

In these ways, averaged or smoothed-out characteristic features of the doppler profile of a particular dismount can be determined over a larger span of time. Such embodiments further enhance detection of the individual.

After the doppler profile is determined, an adaptive matched filter is configured to generate voltages corresponding to the doppler profile of the detected dismount. In some embodiments the matched filter is a two-dimensional filter, with an output that varies with doppler and with the coherent processing interval (CPI) index. The CPI index is a label assigned to each of a number of intervals during which coherent processing of the signal is performed. For example, some embodiments utilize radar signals in the Ka band (i.e., 26.5-40 GHz). In certain of these embodiments, the coherent processing time for one interval (which is assigned one CPI index) is 50 milliseconds. During this interval, an array of radar pulses are transmitted, scattered, received, and processed. In such an embodiment utilizing the Ka band with a 50 ms CPI, a plurality of CPIs are utilized so that the characteristic motion of a walking dismount can be detected. That is, in these embodiments, because each step occurs on the order of every half second, at least ten CPIs are needed to properly receive and detect the signature of a walking dismount.

Some embodiments utilize non-overlapping arrays, while other embodiments utilize overlapping arrays. Embodiments that utilize overlapping arrays enable a reduced signal ambiguity.

Configuring the adaptive matched filter to correspond to the detected doppler profile of the dismount enables the performance of temporal correlation with the received radar returns over subsequent steps. That is, as discussed in more detail below, after determining a characteristic profile of the dismount over one or more steps, the matched filter generates voltages corresponding to signals representing the one or more steps, which are correlated to the next step or steps received by the radar.

The system according to these embodiments correlates this average step profile with subsequently received signals to determine whether the subsequently received signals correspond to subsequent steps of the same particular dismount. In some further embodiments, correlating the average step profile with subsequently received signals includes multiplying the average with the received signal, and in other embodiments with greater processing capabilities, a full calculation of the correlation between the two signals is calculated. This calculation will be well-known to those skilled in the art and is therefore omitted from the instant disclosure.

If the subsequently received signal is a return from a different person, or from another object, the correlation will be relatively low, indicating that the subsequently received signal is not from the same individual previously detected and profiled. If the correlation is relatively high, this is an indication that the subsequently received signal is from the same individual. Thus, these embodiments enable the discrimination of that particular dismount among others that may be proximate to that individual.

In some embodiments, the system is adapted to compensate for variations in the speed at which the dismount is walking or running, or to compensate for changes in the angle of motion of the dismount relative to the radar antenna. That is, although an individual may alter the speed of motion, the doppler profile of the harmonic motion may still be adequately similar such that discrimination of that particular dismount is still enabled. Similarly, when the angle of motion relative to the radar antenna is changed, the doppler profile may stretch or compress in time.

Thus, some embodiments vary a stretch factor of the matched filter in doppler and time, in order to compensate for variations in the gait of the dismount, and/or variations in the angle of motion relative to the radar antenna. Other embodiments vary the stretch factor of the received radar image rather than that of the matched filter. Still other embodiments vary the stretch factor in both the matched filter and the received radar image.

Some embodiments include stored filters that enable target discrimination of a stored profile, for example, a particular dismount with a profile that has been characterized previously. That is, rather than utilizing an adaptive matched filter that generates voltages corresponding to the doppler profile received in real-time, these embodiments include a matched filter that generates voltages corresponding to a stored profile. This output corresponding to a stored profile is then correlated with received data, to determine if the received data represents the particular individual or object represented by the stored profile. Thus, a particular individual whose profile has been previously detected and characterized can be discriminated.

Figure 4:
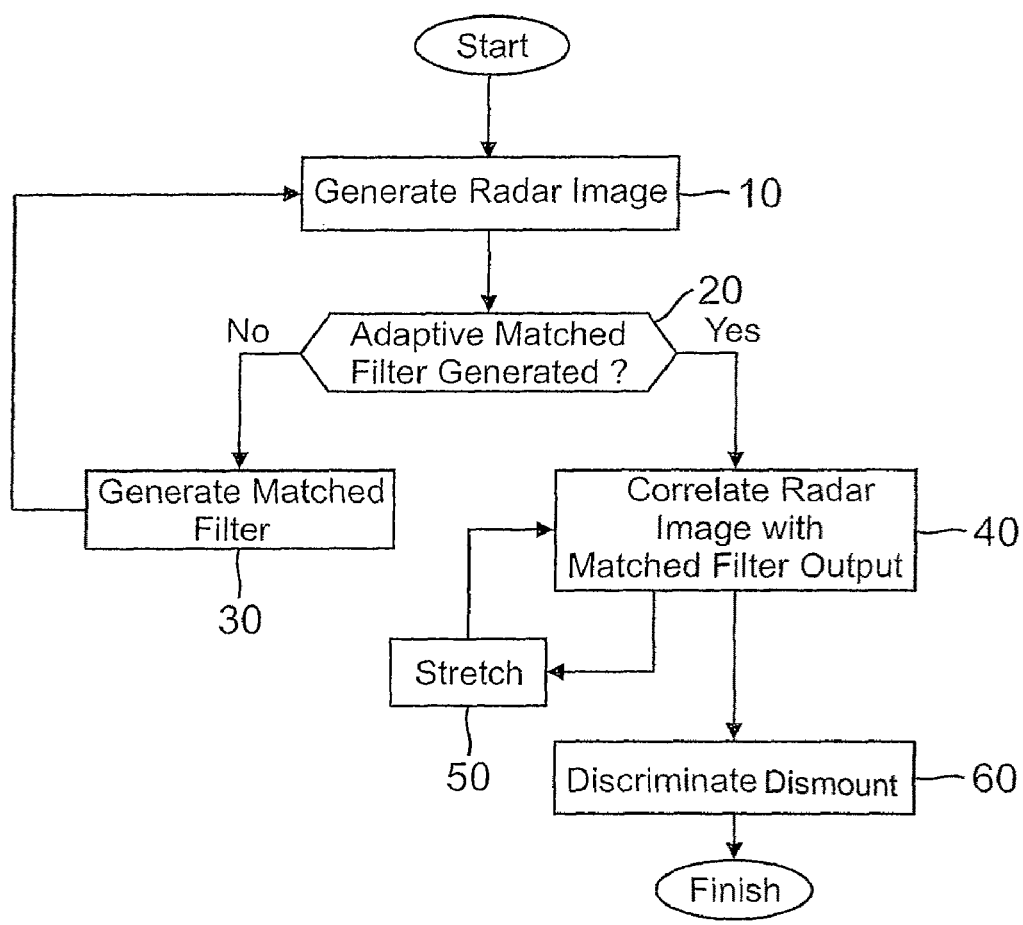
FIG. 4 is a flow chart illustrating a process according to an exemplary embodiment of the present invention.

FIG. 4 is a flow diagram of a process of discriminating a dismount utilizing a ground moving target indicator (GMTI) radar according to an exemplary embodiment of the present invention. In some embodiments the process is performed by hardware such as a digital signal processor (DSP), a microprocessor, or an application specific integrated circuit. In some embodiments the process is performed by software. In some embodiments the process is performed by the system of FIG. 1.

In block 10 the process generates a radar image. In some embodiments the process generates a radar image utilizing a conventional pulse doppler radar, including transmitting a coherent pulse train and receiving a return signal from one or more scatterers. In some embodiments the process performs various sub-processes on the return signal such as low noise amplification, mixing with a local oscillator, and analog to digital conversion, including transforming the received signal to the frequency domain with a fast Fourier transform (FFT). In some embodiments, if there is no signal detected having a range rate within a certain window, such as a window suitably determined to contain slow-moving targets like dismounts, the process ends.

In block 20 the process determines whether a matched filter has been generated. If a matched filter has not yet been generated, then in block 30, the process generates a matched filter based in part or wholly on the received radar image.

If, in block 20, the process determines that a matched filter has been generated, then in block 40, the process correlates the received radar image with the matched filter output. The result of the correlation is used in block 60, during which the process discriminates a particular dismount.

In block 50, some embodiments vary a stretch factor of the matched filter in doppler and time, in order to compensate for these variations in the gait of the dismount, and/or variations in the angle of motion relative to the radar antenna. Other embodiments vary the stretch factor of the received radar image rather than that of the matched filter. Still other embodiments vary the stretch factor in both the matched filter and the received radar image. In various embodiments, the variation of the stretch factor(s) as in block 50, followed by a correlation between the matched filter and the radar image, may be repeated over any number of iterations. One skilled in the art will comprehend that the number of iterations will depend on the capacity of a given system and the availability of processing resources.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. For example, the process may be performed by dedicated hardware such as an ASIC or DSP; custom-configured hardware such as an FPGA; or by software executed by a microprocessor. Additionally, various types of radar may be utilized such as a pulse radar, a continuous wave radar, a moving target indicator, a tracking or an imaging radar, or a guidance radar, among others.

What is claimed is:

1. A method comprising:
   generating an initial radar image corresponding to a received doppler profile of a target measured over a plurality of coherent processing intervals;
   smoothing the initial radar image in doppler or time over the plurality of coherent processing intervals;
   generating a matched filter corresponding to the smoothed initial radar image;
   generating a matched filter signal from the matched filter;
   generating a subsequent radar image; and
   correlating the matched filter signal with the subsequent radar image to discriminate the target.

2. The method of claim 1, further comprising:
   generating a second matched filter corresponding to a stored doppler profile of an intended target;
   generating a second matched filter signal from the second matched filter; and
   correlating the second matched filter signal with the subsequent radar image to discriminate the target.

3. A method comprising:
   generating an initial radar image corresponding to a received doppler profile of a target;
   generating a matched filter signal corresponding to the received doppler profile of the target;
   generating a subsequent radar image; and
   correlating the matched filter signal with the subsequent radar image to discriminate the target,
   wherein generating the initial radar image comprises:

receiving and storing information corresponding to a doppler profile of radiation scattered off the target over a plurality of coherent arrays; and smoothing the information to reduce variations in the information in doppler or time.

4. The method of claim 3, wherein smoothing the information comprises smoothing out variations in the information in doppler.

5. The method of claim 3, wherein smoothing the information comprises calculating a time average of the doppler profile over a plurality of intervals.

6. The method of claim 5, wherein the target is a dismount, and the plurality of intervals comprise a plurality of steps by the dismount.

7. The method of claim 3, wherein generating the matched filter signal comprises generating voltages generally matching the smoothed information in doppler and time.

8. The method of claim 7, further comprising varying a stretch factor of the matched filter, the stretch factor corresponding to a stretching in doppler or in time of the smoothed information.

* * * * *